L. L. LEONARD.
CORNSTALK CUTTER AND LOADER.
APPLICATION FILED NOV. 2, 1915.
1,273,240.
Patented July 23, 1918.
3 SHEETS—SHEET 3.
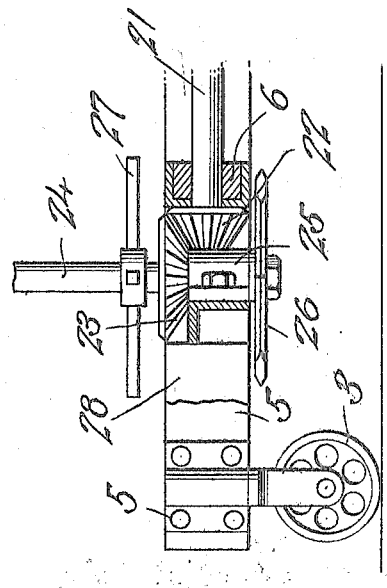
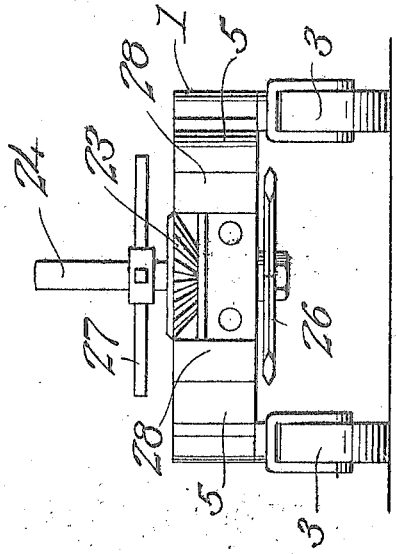
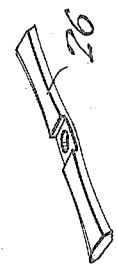
INVENTOR
Lewis L. Leonard,
WITNESSES
BY
ATTORNEY

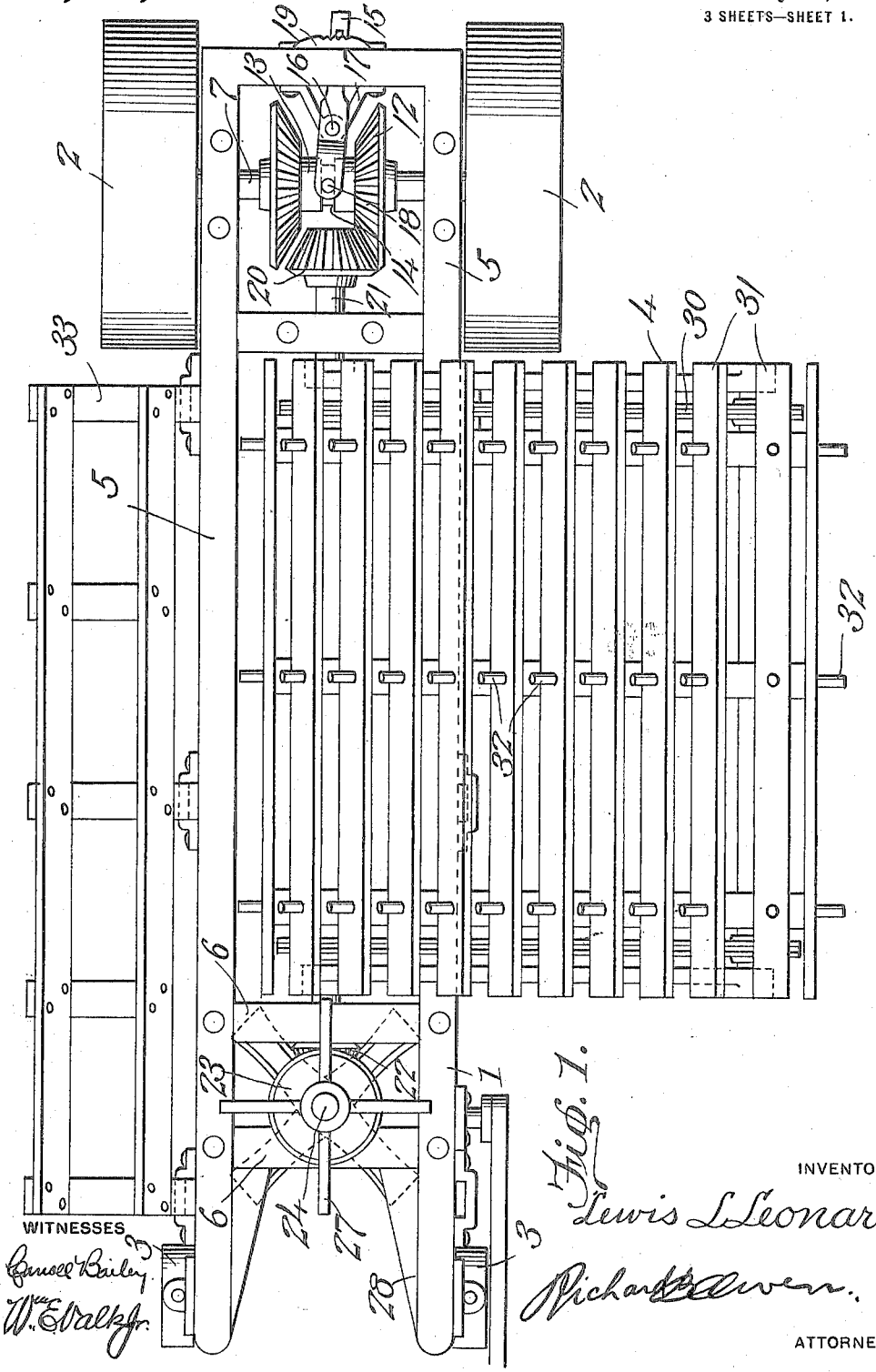

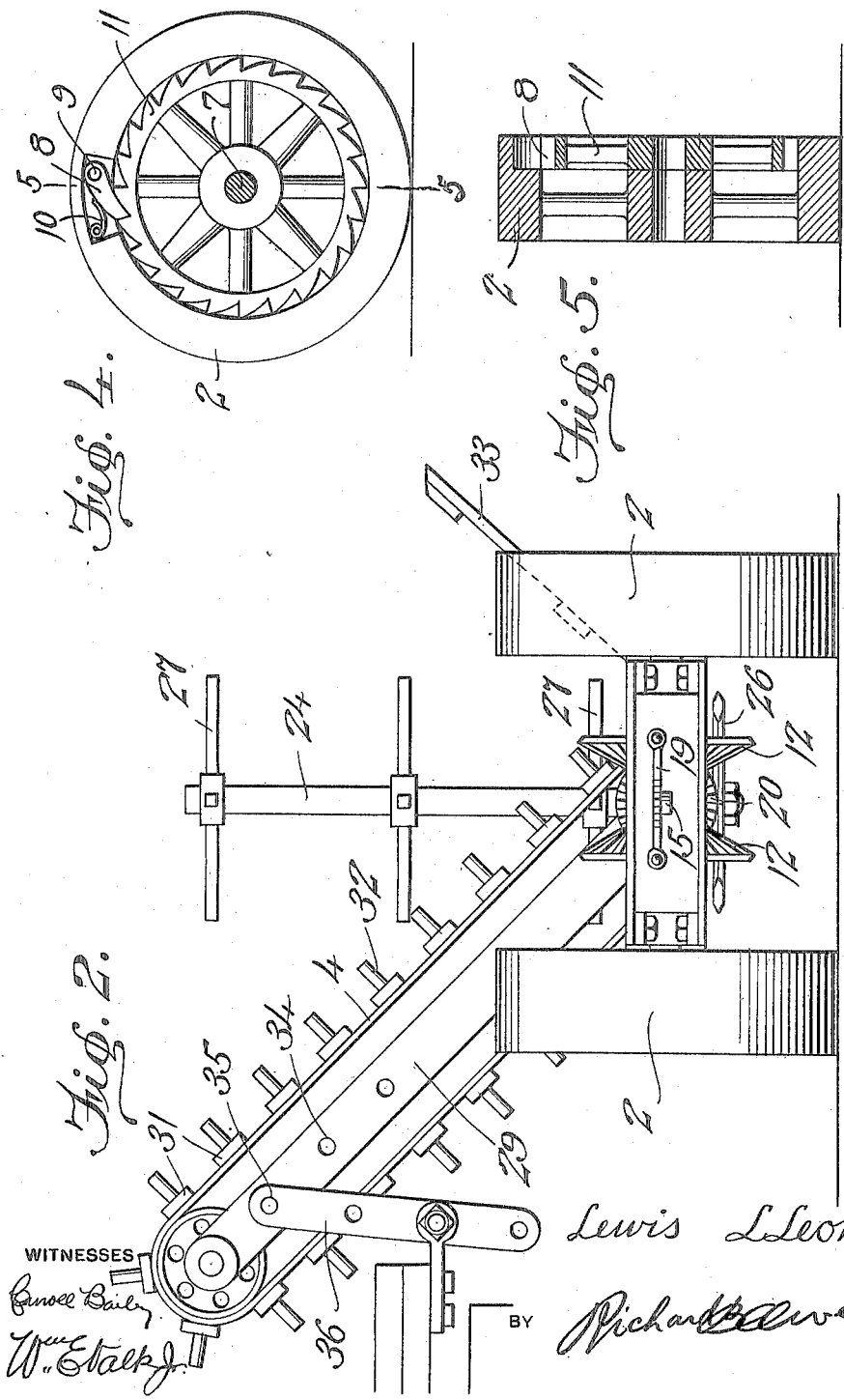

UNITED STATES PATENT OFFICE.

LEWIS L. LEONARD, OF OCEAN GROVE, NEW JERSEY.

CORNSTALK CUTTER AND LOADER.

1,273,240.   Specification of Letters Patent.   Patented July 23, 1918.

Application filed November 2, 1915. Serial No. 59,281.

*To all whom it may concern:*

Be it known that I, LEWIS L. LEONARD, citizen of the United States, residing at Ocean Grove, in the county of Monmouth and State of New Jersey, have invented certain new and useful Improvements in Cornstalk Cutters and Loaders, of which the following is a specification.

My invention relates to agricultural machinery and contemplates primarily an improved combined automatic corn stalk cutter and loader.

The device of my invention is of especial value to the farmer who stores his corn crop in a silo, this for the reason that it is necessary to handle the corn but once, to wit: from wagon to ensilage cutter. It is very readily apparent that this is a great improvement over the use of the cumbersome corn harvesters and binders now almost universally used. With this latter machine, the corn is bound in bundles, and left on the ground. The bundles must then be picked up, placed on the wagon, and when the loader arrives at the ensilage cutter, a part of the binders work must of a necessity be undone, viz: cutting the binding twine before the stalks can be fed to the ensilage cutter. This procedure involves a great amount of apparently unnecessary work. With my improved automatic corn cutter and loader much of this work is avoided. With one man to drive and guide the machine, and another to place the stalks as they are delivered to the wagon by the carrier in the best or most advantageous manner, a large acreage can be harvested quickly and easily and at a minimum cost. At the end of the day, all crops are left standing in the field and therefore unsubjected to deterioration and injury by the serious and sudden event of bad weather conditions.

This objectionable feature is most certainly in evidence where corn harvesters and binders are used and the cut corn, in bundles, left upon the ground.

In view of the foregoing it is evident that the principal object of the present invention is to generally improve in the construction, combination and arrangement of parts constituting a corn stalk cutting and loading machine.

In describing my invention in detail reference will be had to the accompanying drawings wherein like characters denote like or corresponding parts throughout the several views, and in which:—

Figure 1 is a top plan view of my improved stalk cutter and loader;

Fig. 2 is a rear end view;

Fig. 3 is a front end elevation illustrating the cutter mechanism;

Fig. 4 is an elevation of one of the traction wheels;

Fig. 5 is a section on the line 5—5 of Fig. 4;

Fig. 6 is a part sectional and part elevational view of the forward end of the machine; and Fig. 7 is a detail perspective view of one of the cutter blades.

While I have illustrated my combined stalk cutter and loader as best adapted for association with a suitably propelled farm truck or wagon, the same, if desired, may be equipped with an engine in such a manner as to obtain its propelling means.

Referring now to the drawings by numerals, 1 designates the frame, 2—2 the rear supporting wheels, 3—3 the front supporting wheels, and 4 as an entirety the endless conveyer or corn stalk carrier.

The said frame 1 in its preferred embodiment may be said to consist of parallel longitudinal beams 5—5 and transverse or cross beams 6—6. Said supporting wheels 2—2 are mounted loosely upon an axle 7 therefor. Each wheel 2 is equipped with a pawl 8, pivoted as at 9, and spring pressed as indicated at 10 that a ratchet 11 mounted interiorly of the wheel rim, may be rotated therewith during advancement of the machine. The ratchets 11 thus provided are keyed or otherwise fixedly secured to the axle 7 that the latter may be rotated during the advancement of the machine and idled in the event of a reverse or backward movement.

Said axle 7 is equipped with opposed bevel gears 12—12, the mentioned gears being keyed to the axle in a manner permitting of longitudinal sliding movement. A hub 13, grooved as at 14, and common to both gears 12, is provided. The desired sliding or shifting movement of the gears 12—12 is obtained through movement of a lever 15 pivoted as at 16 to a bracket 17, said lever having a pin 18 at its free end for fitting engagement within the groove 14 previously described. A segment 19 may be provided for said lever 15 for locking said lever against movement when adjusted to the position desired. A relatively fixed bevel gear 20 is positioned intermediate the gears 12 that the latter may be shifted into and out of mesh therewith. Said gear 20 is mounted at one end of a shaft 21 journaled in bearings therefor secured to the under side of the machine frame 1. Said shaft 21 extends longitudinally of and terminates at a point adjacent the forward end of the machine. A bevel gear 22 is mounted on said shaft 21 for mesh with a gear 23 in turn mounted on a vertical shaft 24 supported as indicated at 25.

Interlocking transverse cutter blades 26 are attached to said shaft 24 for rotation in a substantially horizontal plane beneath the frame and in proximity to the ground. Opposed longitudinal cutting edges are formed upon the respective blades 26 that they may be reversed and thereafter used.

Knocker arms 27 radiate from the shaft 24 for rotation in a substantially horizontal plane and for a purpose subsequently to appear. The said arms are preferably arranged in series properly superimposed.

Converging guide plates 28 are fastened to the beams 5—5 of the machine frame at the forward end thereof, the mentioned plates jointly acting to direct the corn stalks, during advancement of the machine, against the rotary cutter comprising the mentioned interlocking transverse blades 26.

The stalk carrier or endless conveyer 4 previously referred to is situated directly at the rear of the cutter mechanism or in such proximity thereto as to contact with the corn stalks when severed or cut and directed rearwardly through rotation of the knocker arms 27. Said conveyer 4 in its preferred embodiment consists of a conveyer frame 29, duplicate endless conveyer chains 30 and uniformly spaced parallel conveyer strips 31, the latter, strips 31 being equipped with fingers 32 that the corn stalks directed to the conveyer or carrier may be elevated for deposit onto a farm wagon or truck at one side of the machine and in connection with which the machine is used. Said frame 29 is mounted loose at one end upon the shaft 21 for movement to a vertical position when not in use. The conveyer chains 30 are driven by the shaft 21.

A detachable fender rail 33 may be fastened to the machine frame as illustrated to advantage in Figs. 1 and 2 upon the opposite side thereof from that beyond which the conveyer 4 extends. The fender rail will preclude a falling to the ground of all corn stalks directed thereto through operation of the knocker arms 27 and during advancement of the machine.

Apertures 34 are formed in the sides of the conveyer frame 29 for the reception of a pin 35. Said pin 35 is adjustable vertically with respect to the supporting bracket 36 carried by the farm wagon or truck and, subsequent to adjustment, affords a support for the conveyer when adjusted to the proper angle of inclination. The manner in which the conveyer is supported at an angle to the machine is illustrated to advantage in Fig. 2.

In operation, and during advancement of the machine, the corn stalks to be cut or severed are directed by the guide plates 28 toward the cutter blades 26. As the blades rotate beneath the machine frame 1, it is evident that the stalks will be cut at a point in proximity to the ground and directed toward the conveyer 4 through the action of the knocker bars or arms 27 engaging therewith. When thus cut and directed, the corn stalks are conveyed through the action of the corn stalk carrier to a point at one side of the machine where they are deposited onto the wagon or truck to which the machine is attached.

From the foregoing, taken in connection with the accompanying drawings, it is evident that the direction of rotation of the shaft 21 may be reversed through a shifting movement of the gears 12—12; that the machine may be attached to a farm wagon or truck at either side thereof, it being understood that the fender rail 33 is detachable and the conveyer 4 bodily movable from the position illustrated to a position at a right angle thereto or to extend beyond the opposite side of the machine; and that the operating parts of the machine, by reason of the pawl and ratchet mechanism before described will not reversely operate since the wheels 2—2 will drive said parts only during advancement of the machine.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fullly described my invention, what I claim as new and desire to secure by Letters Patent, is:—

In a corn cutter, a cutter shaft, a rotary cutter thereon, comprising radially disposed blades arranged in the same plane, each blade gradually widening from a middle point toward its ends, and having its edges beveled from opposite sides, said cutter being reversible, and each blade being furthermore cut away transversely at a point adjacent its central portion and extended at right angles thereacross whereby the blades may be disposed in contact and at right angles, and the cut away portions interlocked.

In testimony whereof I affix my signature in presence of two witnesses.

LEWIS L. LEONARD.

Witnesses:
 ERNEST N. WOOLSTON,
 G. WILLIAM SCHWARTZ.

Copies of this patent may be obtained for five cents each, by addressing the "Commissioner of Patents, Washington, D. C."